(12) United States Patent
Kuchuk-Yatsenko et al.

(10) Patent No.: US 8,907,242 B2
(45) Date of Patent: Dec. 9, 2014

(54) MACHINE FOR FLASH-BUTT WELDING OF RAILS

(75) Inventors: Sergey I. Kuchuk-Yatsenko, Kiev (UA); Valerii G. Krivenko, Kiev (UA); Oleksandr V. Didkovskiy, Kiev (UA); Oleksandr K. Kharchenko, Kiev (UA); Andrey N. Levchuk, Kiev (UA)

(73) Assignee: E. O. Paton Electric Welding Institute of the National Academy of Sciences of Ukraine, Kiev (UA)

( * ) Notice: Subject to any disclaimer, the term of this patent is extended or adjusted under 35 U.S.C. 154(b) by 0 days.

(21) Appl. No.: 13/339,921

(22) Filed: Dec. 29, 2011

(65) Prior Publication Data
US 2013/0008874 A1 Jan. 10, 2013

(30) Foreign Application Priority Data
Jul. 8, 2011 (UA) .................... 2011 08577

(51) Int. Cl.
*B23K 11/04* (2006.01)
(52) U.S. Cl.
CPC .......... *B23K 11/046* (2013.01); *B23K 2201/26* (2013.01)
USPC ........................................... 219/55

(58) Field of Classification Search
USPC ................. 219/53–55, 97–99, 101, 108–110
See application file for complete search history.

(56) References Cited

U.S. PATENT DOCUMENTS

| | | | | |
|---|---|---|---|---|
| 1,986,740 A | * | 1/1935 | Moreira | 219/161 |
| 3,349,216 A | * | 10/1967 | Paton et al. | 219/101 |
| 4,217,478 A | * | 8/1980 | Kuchuk-Yatsenko et al. | 219/97 |
| 4,414,454 A | * | 11/1983 | Zollinger | 219/53 |
| 4,645,897 A | * | 2/1987 | Gourlay et al. | 219/101 |
| 4,716,836 A | * | 1/1988 | Hardt | 104/15 |
| 5,389,760 A | * | 2/1995 | Zollinger | 219/53 |
| 6,107,594 A | * | 8/2000 | Matsuo et al. | 219/97 |
| 6,109,503 A | * | 8/2000 | Parker | 228/44.5 |
| 6,163,003 A | * | 12/2000 | Battisti | 219/55 |
| 6,262,385 B1 | * | 7/2001 | Matsuo et al. | 219/97 |
| 6,396,020 B1 | * | 5/2002 | Thelen et al. | 219/54 |
| 6,756,558 B2 | * | 6/2004 | Salzer et al. | 219/112 |
| 6,762,390 B2 | * | 7/2004 | Theurer et al. | 219/53 |
| 6,852,940 B1 | * | 2/2005 | Muhlleitner | 219/55 |
| 2002/0153354 A1 | * | 10/2002 | Norby et al. | 219/55 |
| 2003/0222056 A1 | * | 12/2003 | Salzer et al. | 219/116 |

* cited by examiner

*Primary Examiner* — Dana Ross
*Assistant Examiner* — Frederick Calvetti
(74) *Attorney, Agent, or Firm* — Cesari and McKenna, LLP

(57) ABSTRACT

A machine for the flash butt welding of rails is provided. The machine comprises electric contacts yokes having controlled drives and further comprise holes through which guide pins are passed.

1 Claim, 2 Drawing Sheets

MACHINE FOR FLASH-BUTT WELDING OF RAILS

PRIORITY

The present application claims priority to Ukraine Patent Application No. 2011 08577 which was filed on Jul. 8, 2011.

TECHNICAL FIELD

This invention pertains to the field of welding, namely to the equipment for the flash-butt welding of rails, and can be used both in welding of separate rails and also in welding of long rail sections with a preliminary tension, as well as in repair of rail tracks under field conditions, and is designed for current supply through the displacement and upsetting rods, electric contacts-yokes with a' controlled drive and flexible current-carrying jumpers to the clamping jaws of the welding machine and rails being welded.

BACKGROUND ART

Known is the machine for flash-butt (Author's Certificate, USSR, No. 201561 of 09.1967, B18, cl. 21h,29), comprising two tong-type clamps which are set into motion by clamping hydraulic cylinders. The tong-type clamps are mounted on a common axle. The right clamp can only rotate around its own axis, while the left one, except this, can move along it. The axial displacement of the left clamp is performed by means of two cylinders of upsetting, which operate synchronously from a common hydraulic line. Two welding transformers, connected in parallel, are built into the right clamp levers. The clamping is realized in a rail web using current-carrying copper jaws, manufactured to fit a rail web profile. The welding current to the clamping jaws of the right clamp is supplied' by rigid jumpers from the welding transformer. The current to the clamping jaws of the left clamp is supplied through rods of the upsetting cylinders, electric contacts-yokes and flexible jumpers, arranged inside the left clamp body, thus avoiding the damage of flexible jumpers by molten metal drops in the process of rails flashing. The right clamp is isolated from the left one in rods by using isolating bushings. The driving of the left clamp with respect to the right one in the process of flashing and upsetting is realized automatically by a special speed controller according to a preset program through a hydraulic servo slide valve, built-in into a central axle.

The main drawback of the machine is an insufficient length of flexible current-carrying jumper which does not allow making operation for pulling the long rail sections at a required force.

Machine for the flash-butt welding of rails (Patent of Ukraine No.56986 of, 06.2003, BNo.6, 2003, MBK7 B23KI1104), taken as a prototype, comprising two tong-type clamping devices made in the form of double-arm levers mounted on a common axle and isolated one from another, hydraulic cylinders of clamping and displacement of parts being welded, two welding transformers, built into the arm of the lever of one of two tong-type clamping devices and current-carrying elements which include rods of displacement and upsetting, electric contacts-yokes and flexible jumpers.

The above-described welding machines, including also a prototype, have flexible current-carrying jumpers of a limited length, which are fixed on an electric contacts-yoke, and it, in turn, is permanently connected to the rod of displacement and upsetting of the machine during its assembly. This limited length of the jumpers is not enough for the welding of long sections under field conditions, when it is necessary to provide the pulling of the rail section to be welded on at a required force before the welding process proper by increasing the travel of rods of displacement and upsetting for a distance which exceeds greatly that of the parts displacement necessary directly for the welding process.

The increase in travel of rods of the displacement and upsetting requires the appropriate elongation of flexible current-carrying jumpers. That leads to a significant increase in the resistance of the electric circuit of the welding machine, instability of the welding process and, as a consequence, to the appearance of non-quality welded rail joints. So, to arrange the elongated flexible current-carrying jumpers, it is necessary to increase also the sizes of tong-type clamps, thus increasing the weight and dimensions of the machine.

DISCLOSURE OF THE INVENTION

The task of the invention is to improve the known designs of machines for the flash-butt welding of rails by modernization of an electric circuit of the machine due to adding the new elements, such as controlled drives connected to electric contacts-yokes, and a change in design of the upper part of the electric contacts-yoke by making holes in it and using guide rods, which pass through these holes, and also the mounting of a retaining spring on a lateral surface of each electric contacts-yoke. These improvements make it possible to provide the stability of resistance of the machine electric circuit during welding and to avoid the operation of electric contacts-yokes in fulfillment of auxiliary operations for pulling the long sections being welded on at a required force without changing the optimum welding conditions.

The task is attained because the machine for the flash-butt welding of rails comprises two tong-type clamping devices made in the form of two double-arm levers, mounted on a common central axle and isolated one from another, hydraulic cylinders of clamping and displacement of parts being welded, two welding transformers, built-in into double-arm levers of one of two tong-type clamping devices and current-carrying elements, which include the rods of displacement and upsetting, flexible current-carrying jumpers and electric contacts-yokes with controlled drives. Moreover the upper part of each electric contacts-yoke has holes through which the guide pins are passed, and a retaining spring is fixed on a lateral surface of the electric contacts-yoke.

Due to the fact that the contacts-yokes, equipped with controlled drives, are additionally included into the machine for flash-butt welding of rails, the feasibility appears to unclamp the electric contacts-yokes to release them from the rods of displacement and upsetting due to the formation of a gap between them and, as a result, to provide an increase in travel of the rods of displacement and upsetting at the stage of pulling a long rail section to be welded with a required force without a need for elongation of the flexible current-carrying jumpers and, as consequence, without an increase in resistance of the electric circuit of the welding machine, deterioration of the stability of the welding process and quality of welded joints.

After pulling the long rail section to be welded on with a required force for a preset distance, the command is given for clamping the electric contacts on the rods of displacement and upsetting by means of the controlled drive up to the required force; which provides a reliable contact and their maintaining in this state until the completion of the welding process.

Due to the presence of holes in the upper part of the electric contacts-yokes through which guide pins are passed, the required orientation of electric contacts-yokes in the unclamped position relative to the rods of displacement and upsetting is provided that gives an opportunity for free movement of the displacement and upsetting rods at the stage of pulling of a long rail section to be welded on.

Due to the presence of retaining springs on a lateral surface of electric contact-yoke, the fixation of the electric contacts-yokes is provided in the body of the tong-type clamp of the machine in a strictly definite place, which allows using flexible current-carrying jumpers of a limited length and only at the stage of rails welding.

BRIEF DESCRIPTION OF THE DRAWINGS

The invention is embodied in the following drawings, in which.

DESCRIPTION OF A PREFERRED EMBODIMENT

Figure 1:
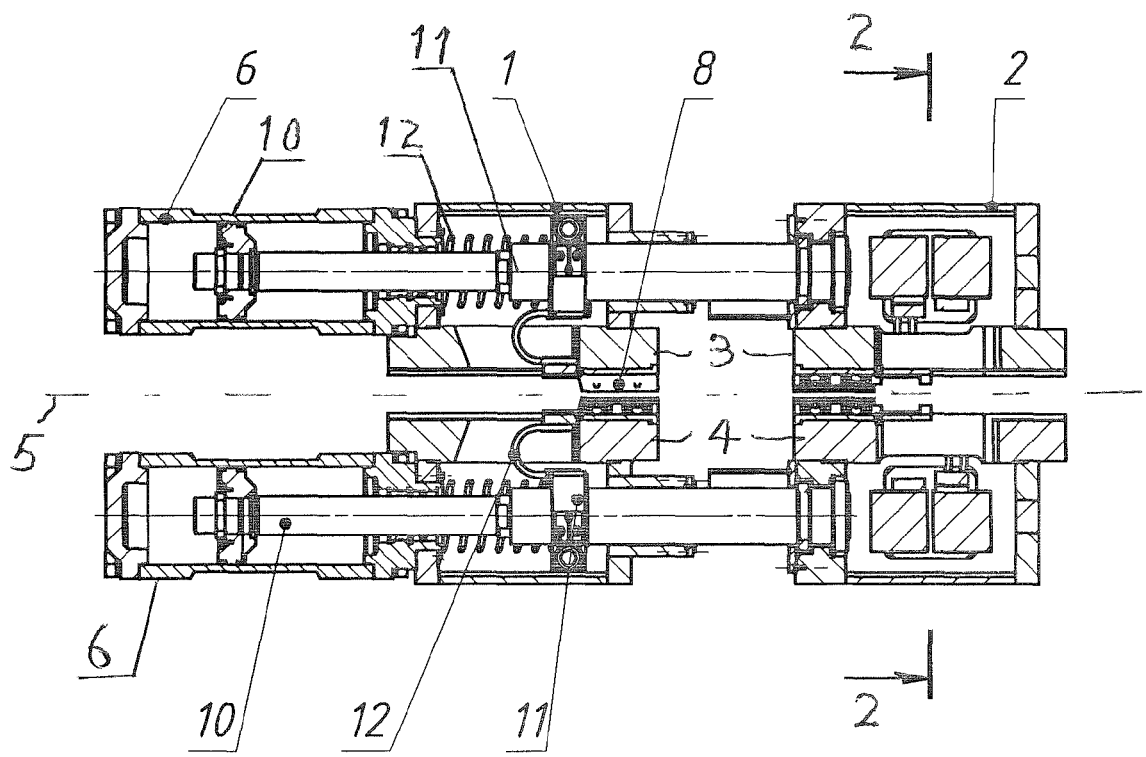
FIG. 1 is a longitudinal section of a machine incorporating the invention.
Figure 2:
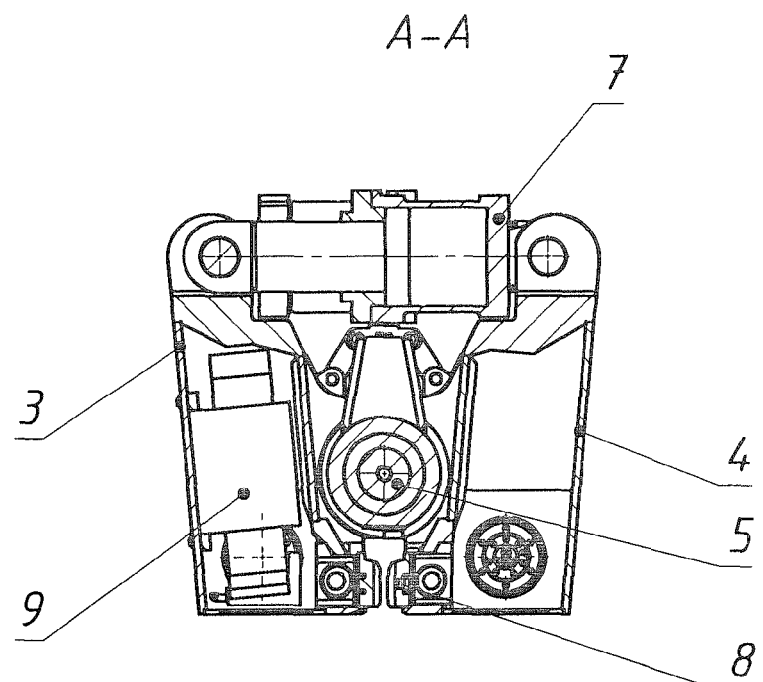
FIG. 2 is a transverse section taken along line 2-2 of FIG. 1.
Figure 3:
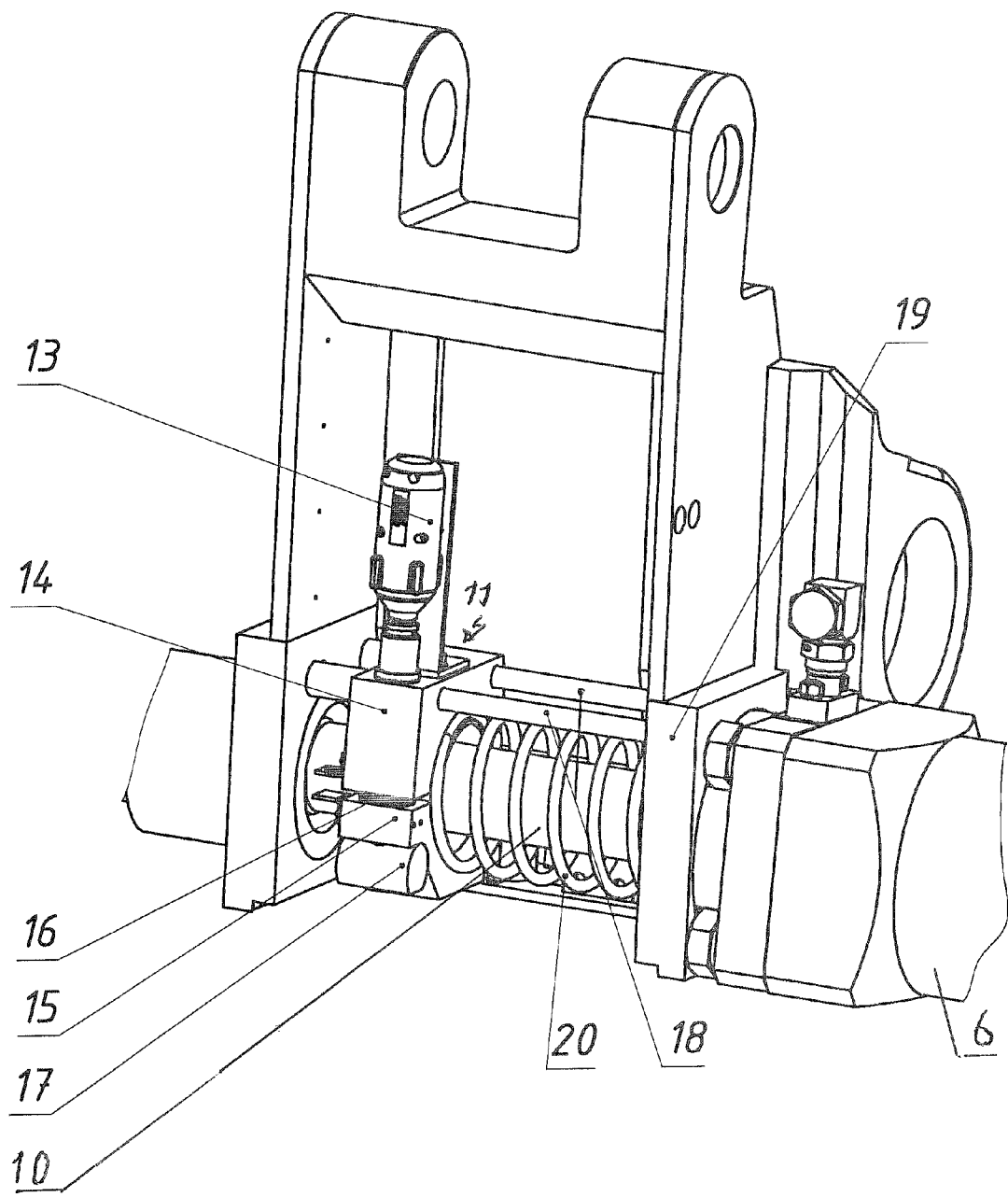
FIG. 3 is a perspective view on a larger scale showing the design of electric contacts-yoke with controlled drive in the FIG. 1 machine.

A machine for rail flash-butt welding comprises two tong-type clamping devices 1 and 2 (FIG. 1), each consisting of two double-arm levers 3 and 4 (FIGS. 1 and 2) mounted on a common central axle 5 (FIGS. 1 and 2) with capability of relative movement along it by displacement-upsetting hydraulic cylinders 6 (FIGS. 1 and 3) operating synchronously from a common hydraulic line. The tong-type clamps 1 and 2 are isolated from each other on all three rods incorporating them and each of the double-arm levers 3 and 4 in the upper part is hinged to the rod or casing of hydraulic cylinders of clamping 7 (FIG. 2), and in the lower part it has the current-carrying clamping jaws 8 (FIG. 2), which clamp the rails to be welded in the web and are manufactured to fit the web profile of the rails being welded. In the right clamping device 2 two welding transformers 9 are arranged (FIG. 2), which are connected in parallel. Welding current to the clamping jaws 8 of the right clamp is supplied by rigid jumpers (not shown) directly from the welding transformers. The current is supplied to the clamping jaws of the left clamp through the rods 10 (FIG. 1) of the displacement-upsetting cylinders 6, electric contacts-yokes 11 (FIG. 1) with a controlled drive 13 (FIG. 3) and flexible current-carrying jumpers 12 (FIGS. 1 and 3). Each electric contacts-yoke with a controlled drive 13 includes upper 14 (FIG. 3) and lower 15 (FIG. 3) parts hinge-connected between themselves, which are clamped and unclamped on the rod 10 of the corresponding displacement-upsetting cylinder 6 using a screw 16 (FIG. 3) and a nut 17 (FIG. 3). The upper part of each electric contacts-yoke 11 has holes through which guide pins 18 are passed (FIG. 3). A retaining spring 20 (FIG. 3) is fixed between the lateral surface of the electric contacts-yoke 11 and a lateral wall 19 of a clamping lever (FIG. 3). Thus, using the flexible current-carrying jumper 12, the electric contacts-yoke 11 with a controlled drive 13 is connected to the associated current-carrying clamping jaws 8.

The operation of the rail-welding machine with electric contacts-yokes having controlled drives, can be described as follows. When welding the long rail sections, which should be preliminarily pulled closer by applying necessary force of a preset value, their ends are clamped by double-arm levers 3 and 4 in tong-type clamps 1 and 2 by means of clamping cylinders 7. Here, the tong-type clamps 1 and 2 are spread apart with clamp 2 in an extreme right position, each electric contacts-yoke 11 with a controlled drive 13 is unclamped and fixed in a strictly definite place, and there is a fixed gap between electric contacts-yoke 11 and the corresponding rod 10 of displacement and upsetting cylinders 6 allowing the rods to move freely, and the electric contacts-yokes 11 to remain fixed. When the tong-type clamps move the distance necessary for pulling the long rail sections, a command is given to the controlled drive 13 of each electric contacts-yoke. The electric contacts-yokes 11 at a required force are clamped on the displacement and upsetting rods 10 and welding current is supplied to the clamping jaws 8 by way of the flexible jumpers 12. After the completion of process of welding the long rail sections, the command is given for unclamping the electric contacts-yokes 11 and, by means of the retaining springs 20, during the machine returning to its initial position, now each electric contacts-yoke 11 is returned to its strictly definite location. The machine is now ready to perform the next welding cycle.

The application of this machine for rail flash-butt welding with electric contacts-yokes, having controlled drives, allows using a limited length of current-carrying jumpers and thus avoiding an increase in resistance of the electric circuit of the welding machine, and thus providing a stable welding process and, as a consequence, preventing the formation of rejected welded joints.

What is claimed is:

1. A machine for the flash-butt welding of rails, the machine comprising:

two current-carrying clamping devices made in the form of two double-arm levers mounted on a common central axle and isolated one from another, displacement and upsetting hydraulic cylinders for clamping and displacement of parts being welded;

two welding transformers built into the double-arm levers of one of the two clamping devices;

current-carrying elements including rods of the displacement and upsetting hydraulic cylinders;

electric contacts-yokes and current-carrying flexible jumpers, wherein the electric contacts-yokes have controlled drives, the upper part of each electric contact-yoke having holes through which guide pins are passed, and where the controlled drives cause the electric contacts-yokes to clamp and unclamp on the rods of the displacement and upsetting cylinders; and a retaining spring being fixed between a lateral surface of the electric contacts-yokes and a lateral wall of each of the two double-arm levers, wherein using the current-carrying flexible jumpers, the electric contacts-yokes with the controlled drive being connected to associated current-carrying clamping devices.

* * * * *